Figure 1:
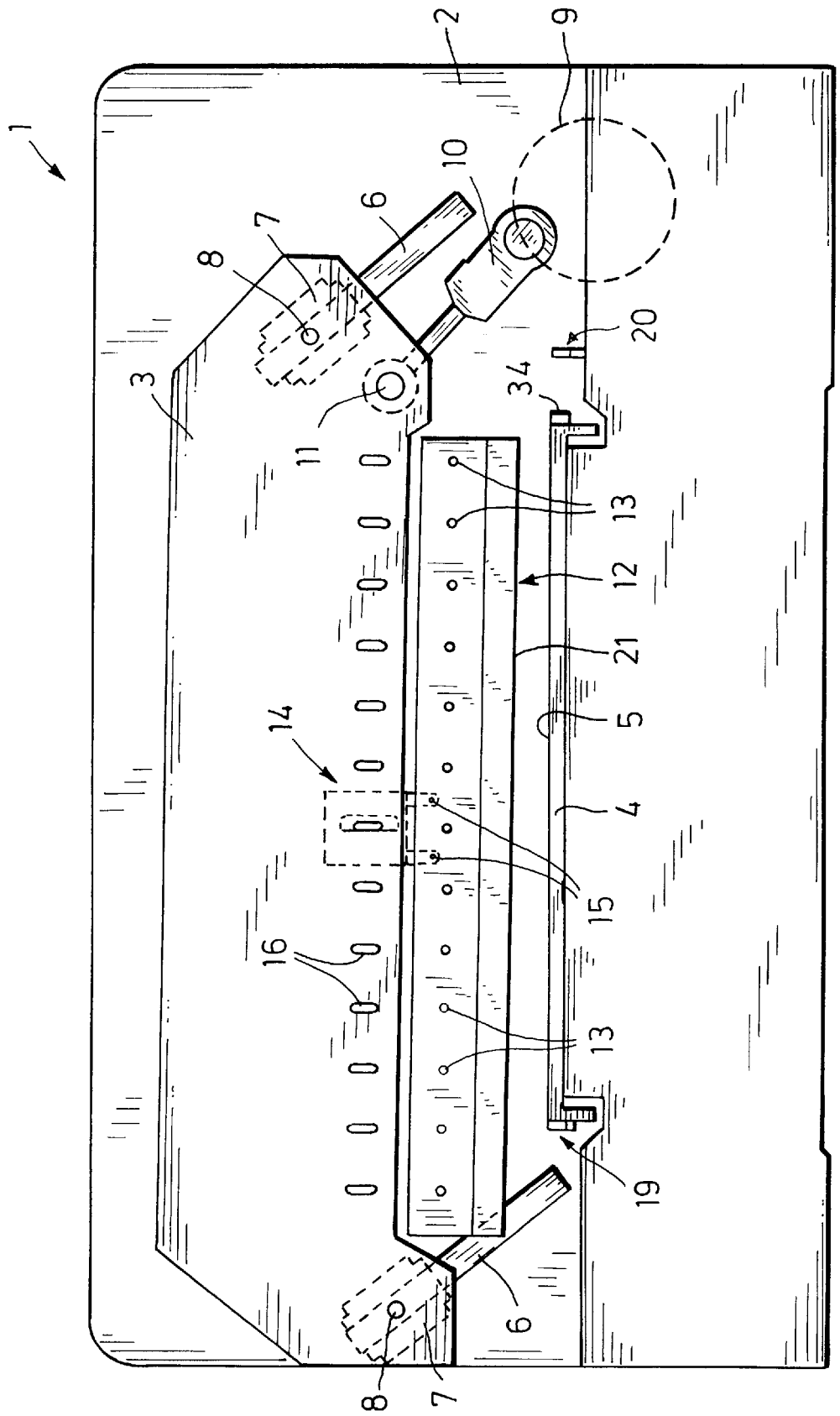

United States Patent [19]
Gross et al.

[11] Patent Number: 6,132,348
[45] Date of Patent: Oct. 17, 2000

[54] METHOD FOR ADJUSTING A KNIFE IN CHANGING KNIVES, AND A CUTTING MACHINE WITH KNIFE CHANGING DEVICE

[75] Inventors: Helmut Gross, Hofheim/Taunus; Adolf Rasch, Wiesbaden, both of Germany

[73] Assignee: Adolf Mohr Maschinenfabrik GmbH & Co. KG, Hofheim am Taunus, Germany

[21] Appl. No.: 09/231,432

[22] Filed: Jan. 14, 1999

[30]   Foreign Application Priority Data

Feb. 6, 1998   [DE]   Germany ................... 198 04 677

[51] Int. Cl.[7] .................................................. B23Q 3/00
[52] U.S. Cl. ................................. 483/13; 83/13; 83/954
[58] Field of Search ............................... 83/13, 934, 658, 83/646, 647, 647.5, 699.31, 699.41, 699.51, 699.61; 483/13; 409/218; 33/642, 185

[56]        References Cited

U.S. PATENT DOCUMENTS

| | | | |
|---|---|---|---|
| 1,485,886 | 3/1924 | Russell | 83/698.31 |
| 2,281,877 | 5/1942 | Green | 83/698.11 |
| 2,525,401 | 10/1950 | Dehn | 83/694 |
| 2,734,572 | 2/1956 | Pater | 29/6.1 |
| 2,939,358 | 6/1960 | Pearson | 83/699.41 |
| 3,003,381 | 10/1961 | Biel et al. | 83/638 |
| 3,465,632 | 9/1969 | Bilek | 83/556 |
| 4,054,076 | 10/1977 | Kumabe | 83/644 |
| 5,784,940 | 7/1998 | Gross et al. | 83/699.41 |

*Primary Examiner*—Rinaldi I. Rada
*Assistant Examiner*—Kim Ngoc Tran
*Attorney, Agent, or Firm*—Max Fogiel

[57]           ABSTRACT

A method of adjusting a blade (12) in its lowermost position while replacing a used one in a machine for cutting paper, cardboard, and similar stock. The blade is loosely attached to a blade holder that travels up and down. The blade can be loosened from the holder and raised and lowered therein. With the blade holder down, the blade can be adjusted by lowering it against at least one support (19 or 20) at the level of the stock being cut.

The backing strip is removed from the stock-positioning board. The support is advanced out of a disengaged position and into an engaged, blade-adjustment, position. The blade holder, accommodating the blade loose in its raised position, is lowered into its lowermost position. The blade is lowered onto the support in its engaged position and secured tight to the blade holder in that position. The blade holder is raised. The support is returned into its disengaged position. The backing strip is replaced in the stock-positioning board.

A machine for carrying out the method has a blade-replacement device with a mechanism for adjusting the blade in its lowermost position.

6 Claims, 5 Drawing Sheets

METHOD FOR ADJUSTING A KNIFE IN CHANGING KNIVES, AND A CUTTING MACHINE WITH KNIFE CHANGING DEVICE

The present invention concerns first a method of adjusting a blade in its lowermost position while replacing a used one in a machine for cutting paper, cardboard, and similar stock. The blade is loosely attached to a blade holder that travels up and down. The blade can be loosened from the holder and raised and lowered therein. With the blade holder down, the blade can be adjusted by lowering it against at least one support at the level of the stock being cut. Machines that employ such a method are provided with stock-positioning boards and backing strips.

Many stock-cutting machines of this genus are known. They include a frame that accommodates a blade holder. The blade holder travels down to lower the blade and cut the stock and up to raise the blade into the disengaged position. Since the blade usually pivots, dropping and progressing to one side simultaneously, it will not come to rest horizontal and parallel against a flat backing strip on the cutting board until the end of the stroke. The backing strip is generally plastic, polyvinyl-chloride or polypropylene for example, embedded in the stock-positioning board. The blade penetrates into the backing strip to some extent at the end of its downward stroke to ensure that even the lowermost sheets in the stack are cut through.

Preliminary adjustment of the blade by resting it against the backing strip is known. A fresh blade can be fine-adjusted when installed, generally by means of cams in the vicinity of the pivot or by central adjustment of the depth of a connecting rod in the blade holder's transmission. Orienting the blade along the stock cutting strip, however, is difficult. The blade is initially accommodated loose in the holder on a lifting mechanism. The holder is lowered all the way down, and the blade lowered within the holder on the lifting mechanism until it comes to rest against the stock cutting strip with its narrow edge digging slightly into the strip subject to gravity. The blade is then secured tight to the holder with screws. Since this procedure tightens the blade perpendicular to the cutting plane and toward the cutting beam, the hard edge of the blade is exposed to shear perpendicular to the cutting plane while dug into the backing strip. The edge can break away, and the fresh blade will be useless from the beginning.

In such a procedure, especially when the stock being cut is resting on a pad and not directly on the board, the blade may, to prevent cutting into the pad, have to be oriented not toward the backing strip as prescribed.

The present invention also concerns a machine for cutting paper, cardboard, and similar stock, especially in stacks, with a frame accommodating a blade holder that travels up and down and in turn accommodates a replaceable blade, with a board that accommodates the stock being cut, and with a mechanism for adjusting a fresh blade.

A machine of this genus with a blade-replacement device that includes a blade-adjustment mechanism is known from German 19 516 347 A1. The blade-adjustment mechanism is mounted on the blade holder, and the blade is oriented not toward the backing strip but toward the holder. Tolerances between the blade and the holder, especially those due to the position of the blade-adjustment mechanism in the blade holder, render preliminary adjustment very imprecise, and overall adjustment depends primarily on the cams in the vicinity of the pivot or on central adjustment of the depth of the connecting rod. Such machines feature levers articulated to the blade holder that primarily maintain the blade in position once it has been adjusted.

A mechanism for adjusting the blades in machines for cutting paper, cardboard, and similar stock is known from German OS 2 039 128. The blade is secured to a beam by screws that extend through bores, and wear on the blade can be compensated by adjusting the length of a rod that tensions the beam. The blade is adjusted by means of gauges secured detachable to the stock-positioning board or to the machine itself. The walls of the gauges determine the proper height for the edge of the blade. Alternatively, that height can be established by beams of light that display it, especially on the lowered stack holdfast. One object of the present invention is a simple method of precisely adjusting a fresh blade in its lowermost position. Another object is a simple machine that will allow precise adjustment of a blade at its optimal height in relation to the surface the stock is resting on.

The first object is attained in accordance with the present invention in a method characterized in that a. the backing strip is removed from the stock-positioning board.

b. the support is advanced out of a disengaged position and into an engaged, blade-adjustment, position, c. the blade holder, accommodating the blade loose in its raised position, is lowered into its lowermost position, d. the blade is lowered onto the support in its engaged position and secured tight to the blade holder in that position, e. the blade holder is raised, f. the support is returned into its disengaged position, and g. the backing strip is replaced in the stock-positioning board.

A significant characteristic of the method in accordance with the present invention is that the backing strip is removed from the stock-positioning board while the blade is being replaced and at least one support advanced into an engaged position instead where it secures the position of the adjusted blade. The blade is in a practical way supported at two separate points, specifically at each end, two supports being necessary. To activate the supports requires only moving them from where the blade is not actively in operation to one where the blade is at its lowermost position in operation. The support or supports can be moved horizontally. It is on the other preferable for their disengaged position, in terms of the surface that the blade rests against, to be below the surface that the stock being cut rests on and for their engaged position to be more or less on the same level as that of the stock. This can be ensured particularly simply by articulating the support or supports to the stock-positioning board. Once the blade has been adjusted resting on the supports and secured tight to the blade holder and the blade holder raised, the backing strip can be replaced in the stock-positioning board. If the supports in their engaged position are where the backing strip is usually embedded in the board, the strip can of course not be replaced until the support or supports are back in the disengaged position.

All the steps in the method can be followed in the sequence a through g. It is, however, alternatively possible to carry out steps a through c in any order followed by step d. It is also alternatively possible to carry out steps f and g in either order before [sic! —trans.] step e.

In one preferred embodiment of the present invention, the support is raised when the backing strip is removed from the stock-positioning board and lowered when the strip is replaced. The removal and replacement of the backing strip is accordingly synchronized with the motion of the support or supports between the engaged and disengaged positions.

To adjust the blade to different heights, in relation to a pad for example, the articulation of the supports can be displaced eccentrically.

The machine for cutting paper, cardboard, and similar stock with a blade-replacement device in accordance with the present invention is characterized in that the blade-adjustment mechanism is accommodated in the stock-positioning board and can be moved back and forth between a disengaged position and an engaged position, comprises at least one support, whereby the surface of the support that the blade rests on when the support is in its engaged position is on the level of the stock-supporting surface and near the edge of the blade once the blade has been lowered for replacement and, when the support is in the disengaged position, below the stock-supporting surface and away from the lowered blade. The support or supports can be moved in many ways, pneumatically, hydraulically, electrically, or even mechanically, in particular. If the transmission is mechanical, the motion of the backing strip as it enters and leaves the stock-positioning board can be exploited to drive a mechanism that moves the support or supports back and forth between the engaged and disengaged positions. The machine will preferably have several supports, with the lowered blade resting on supports outside the blade's range during the replacement procedure. If, even though the supports are of a hard material like metal, ceramic, or hard plastic, the hard blade is still damaged during the adjustment procedure, the damage would not be especially serious as affecting only the portion of the blade that is not actually involved in cutting anything. One special provision of the present invention is that the blade-adjustment mechanism can have two supports extending out of the backing strip as it is embedded in the stock-positioning board. It is particularly practical for each support to be articulated into the stock-positioning board such that, while the support is in its engaged position, the surface the blade rests on will be on the same level as the surface the stock rests on. That level can be that of the surface of the stock-positioning board, although it is also conceivable, if the stock rests on a pad, for the upper surface of the pad to be on the same level as the surface of the support that the blade rests on.

The support need not be entirely hard. It can be provided with a hard insert that can be replaced as needed.

As hereintofore mentioned, it is of particular advantage to kinematically synchronize the motions of the supports. In this event, the backing strip embedded in the stock-positioning board can advance a component of the kinematic mechanism into an engaged position while the supports are not in their engaged position. It will be preferable, then, for resilient means to force the supports into their engaged position and for the kinematics to include means of applying tension to the supports against the force applied by the resilient means. The means of applying tension can be a Bowden cord for example.

Further details of the present invention will be evident from the following specification and from the drawing. All characteristics and combinations thereof are essential to the present invention.

Figure 2:
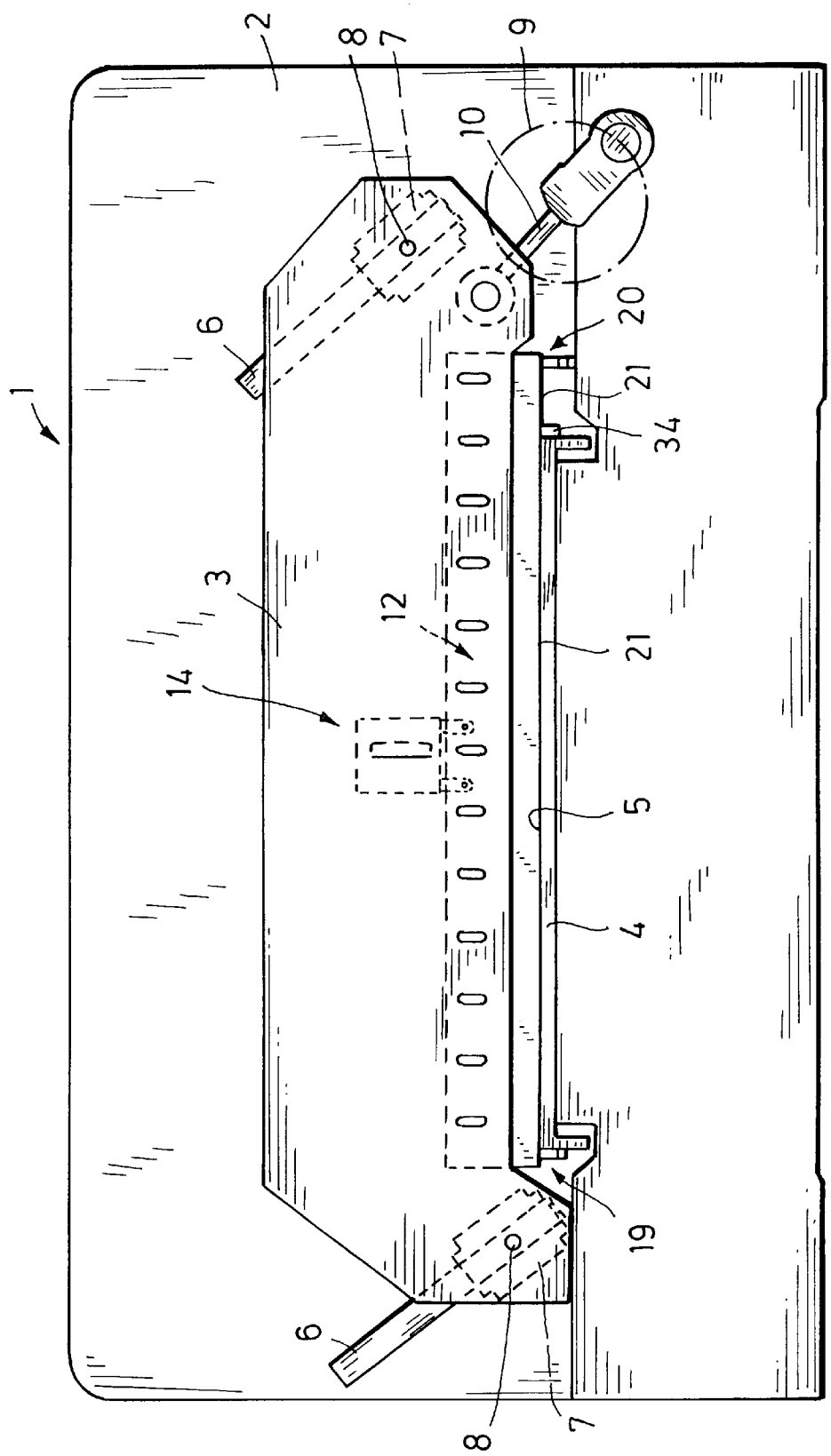

Two embodiments of a stock-cutting machine with a blade-adjustment mechanism that operates by the method in accordance with the present invention will now be specified by way of example and without limiting the scope of the invention in any way with reference to the accompanying schematic drawing, wherein FIG. 1 is a front view of the stock-cutting machines with the blade holder raised and the blade down and secured in the lifting mechanism, FIG. 2 is a view similar to that in FIG. 1 with the blade raised off the blade holder and with the blade holder down (in the adjustment position).

Figure 3:
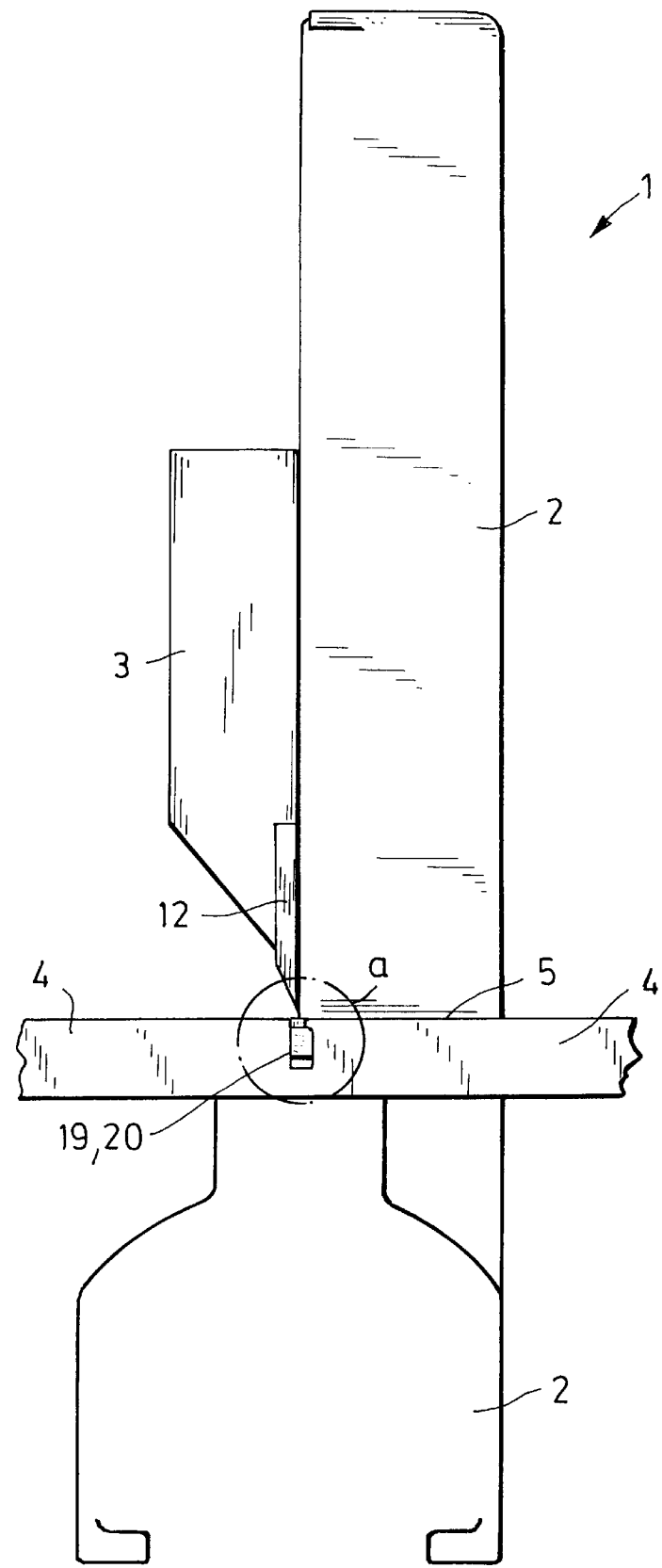
Figure 4:
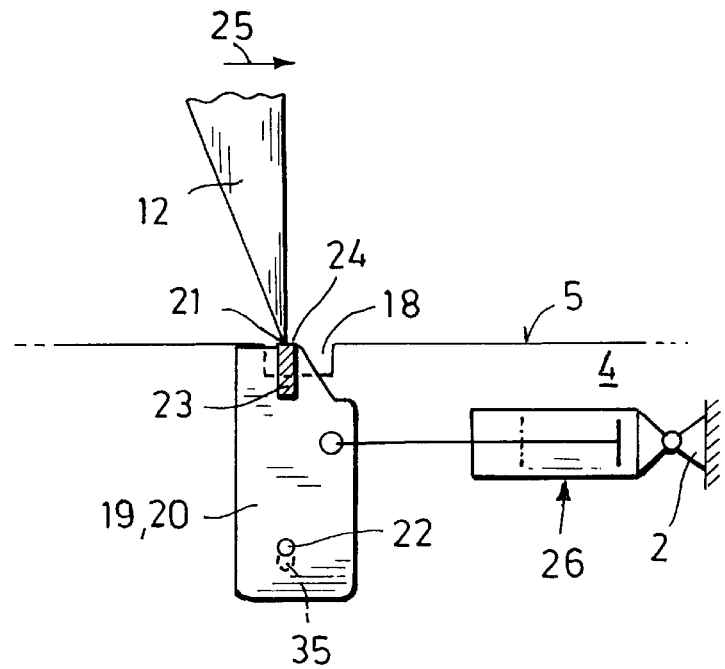
Figure 5:
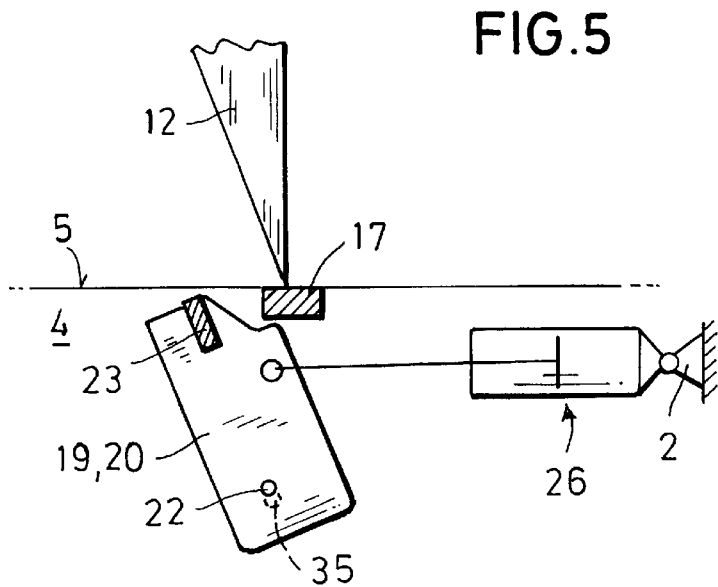
Figure 6:
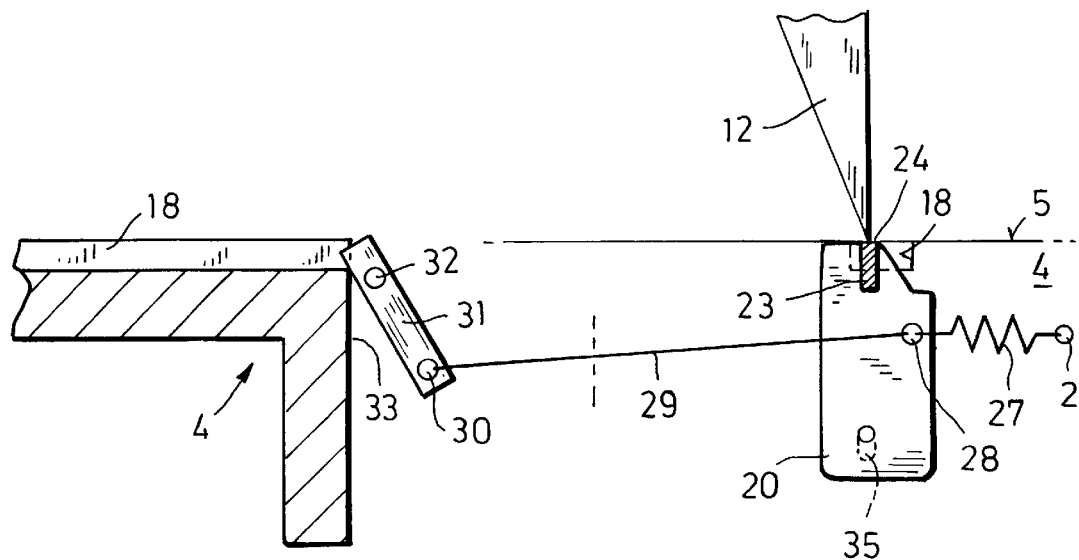
Figure 7:
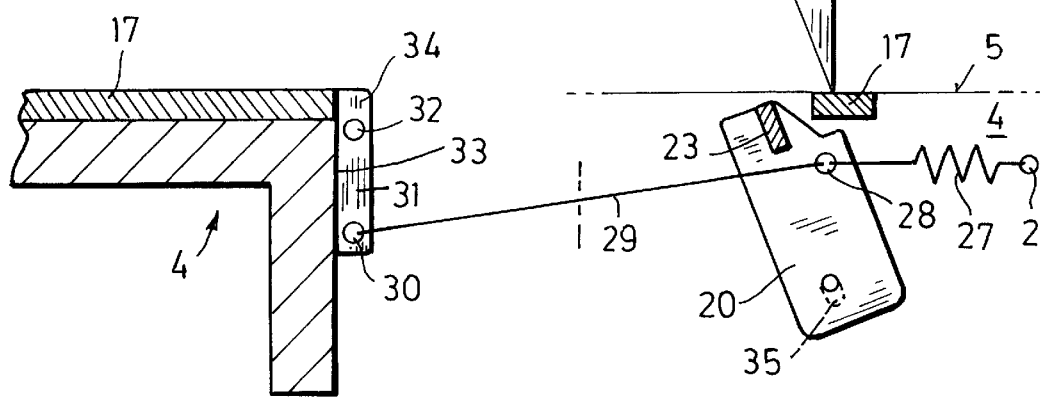

FIG. 3 is a perpendicular section through the stock-cutting machine with the blade in the adjustment position), FIG. 4 is a detail of the area a in FIG. 3 with the support, which can be pivoted by a piston-and-cylinder mechanism in the first embodiment, in the engaged position, FIG. 5 is a similar detail showing the support in the disengaged position, FIG. 6 is a similar detail showing the support, which can be pivoted mechanically in the second embodiment, in the engaged position, and FIG. 7 is a similar detail showing the support in the disengaged position.

FIGS. 5 and 7 for simplicity's sake illustrate the range of activity of the lever and support at two different levels, and the Bowden cord illustrated therein must be imagined as diverted.

The generic stock-cutting machine 1 illustrated in FIG. 1 can execute a pivoting cutting motion. Machine 1 is provided with a frame 2. A blade holder 3 travels up and down in the frame. Machine frame 2 also accommodates a board 4 for positioning stock that is to be or has been cut and rests on the board's surface 5. Two rails 6 are also accommodated in machine frame 2, sloping above and to the sides of board 4. A carriage 7 travels back and forth along each rail. Blade holder 3 is articulated to each carriage 7 by a pin 8. Machine frame 2 also accommodates a crank 9, sketchily indicated by a dot-and-dash circle and driven by a motor. Attached to crank 9 is a connecting rod 10 that is articulated at its other end to a pin 11 in blade holder 3. Due to this kinematic connection, a complete rotation of crank 9 will move the blade holder out of is uppermost position into a cutting position and back.

Blade holder 3 accommodates a blade 12. The blade is provided over its total length with threaded bores 13. Blade holder 3 is provided with an equal number of essentially vertical slots. The blade is fastened to the blade holder with unillustrated screws that extend through the bores and into the slots.

Blade holder 3 is represented all the way up in FIG. 1 and ready to have its blade replaced. Integrated into the holder is a state-of-the-art blade-lifting mechanism 14. Two projections 15 extending out of the rising-and-descending part of blade-lifting mechanism 14 are suspended in holes in blade 12. Mechanism 14 is represented with its rising-and-descending part entirely down and with blade 12 accommodated in it. The part then rises all the way up, conveying blade 12 into its uppermost position in blade holder 3. Blade 12 must remain loosely attached to blade holder 3 in this position to prevent it from dropping out and getting damaged. The screws in at least two bores 13 and slots 16 are accordingly left partly screwed into the blade. Slots 16 will accordingly maintain blade 12 fixed in relation to blade holder 3 but allow it to move perpendicular to its cutting edge.

How a fresh blade 12 is adjusted will now be specified with reference to FIG. 2 and with the just described position in relation to blade holder 3 as a point of departure. Blade holder 3 is moved all the way down and retained there. A backing strip 17 embedded in board 4 is removed from its accommodating groove 18 below blade 12 as illustrated in FIGS. 4 and 5. Blade-lifting mechanism 14 now lowers blade 12, loosely attached to blade holder 3, onto a blade-adjustment mechanism.

As will be evident from FIGS. 2 through 5, the blade-adjustment mechanism comprises two supports 19 and 20.

Support 19 is below blade 12 in the immediate vicinity of board 4 and on the side of the board facing away from connecting rod 10. Support 20 on the other hand is away from board 4 and on the side facing toward connecting rod 10. Supports 19 and 20 can accordingly be brought into contact with the cutting edge 21 of blade 12 at each end.

As will be particularly evident from FIGS. 3 through 5, supports 19 and 20 pivot around a shaft 22 in machine frame 2. Each support has a groove at the top that accommodates an inlay 23 of some hard material, such as metal, ceramic, or a hard plastic. The surface 24 of inlay 23 that faces the cutting edge 21 of blade 12 is on the same level as the surface 5 of board 4 as long as supports 19 and 20 are in their engaged position.

How the blade is adjusted will now be specified. Blade 12 is lowered onto the inlays 23 in supports 19 and 20 as represented in FIGS. 3 and 4. The blade is now securely fixed to blade holder 3 by tightening all the screws that extend through slots 16 and into bores 13. Blade 12 is accordingly shifted slightly toward blade holder 3 in the direction indicated by arrow 25 in FIG. 4. Once blade 12 has been fastened tight to blade holder 3, the holder is lifted back into the position illustrated in FIG. 1. Once the blade as been preliminarily adjusted as just described by means of the blade-adjustment mechanism, it can be fine-adjusted by means of cams in the vicinity of the blade holder's pivot or by central adjustment of the depth of the connecting rod.

Once blade 12 has been raised while attached to blade holder 3, supports 19 and 20 can be pivoted out of the way by a piston-and-cylinder mechanism 26 accommodated in machine frame 2. Mechanism can be pneumatic, with one extreme state determining the engaged position represented in FIG. 4 and the other the disengaged position represented in FIG. 5 of supports 19 and 20. FIG. 5 represents supports 19 and 20 pivoted out of the groove 18 in board 4, with backing strip 17 back in the groove. During the cutting process, the cutting edge 21 of blade 12 comes into contact with backing strip 17 as represented in FIG. 5, and digs into it to some extent to ensure that the bottommost sheet in the stack is cut entirely through.

In the embodiment illustrated in FIGS. 4 and 5, backing strip 17 is introduced into and removed from groove 18 independently of the pivoting motion of the supports into and out of their engaged and disengaged positions.

FIGS. 6 and 7 illustrate how the motions involved in introducing and removing backing strip 17 are coupled with the pivoting motion of each support into and out of its engaged and disengaged positions. In this particular embodiment a tension spring 27 engages both supports 19 and 20 and machine frame 2. A Bowden cord 29 engages the support-side point 28 of attachment of tension spring 27 in the opposite direction. The other end of cord 29 is attached to a point 30 at the free end of a lever 31. Lever 31 pivots around a shaft 32 in board 4. The section 34 of lever 31 that extends out beyond shaft 32 acts as a stop for the backing strip 17 in groove 18. Such a stop is necessary to prevent the strip from sliding back and forth in the groove while the blade is executing a pivoting motion and emitting a component of force toward either connecting rod 10 or support 20. As long as backing strip 17 is, as illustrated in FIG. 6, not in groove 18, the tension spring 27 will maintain both support 20 and support 19, which is connected to it by another, unillustrated, Bowden cord, in their engaged positions. When backing strip 17 is inserted into groove 18 and forced against lever section 34 on the other hand, lever 31 will pivot into its extreme position against the impacting edge 33 of board 4. Lever 31 will accordingly force support 20 by way of Bowden cord 29, and support 20 will force support 19 by way of the unillustrated other cord, against the force of tension spring 27 and against the force of another tension spring on support 19 into the disengaged position represented in FIG. 7. For simplicity's sake, the ranges of lever 31 and support 20, which actually operate at different levels, are represented in a single figure. The Bowden cord 29 illustrated in these figures must accordingly be understood as diverted at a point between points 28 and 30 of attachment. This situation is depicted simplified in the figures by the broken line that represents several deflections.

If the stock being cut rests on a pad and not directly on the surface 5 of board 4, blade 12 will need to be adjusted higher. This can easily be done if supports 19 and 20 are mounted on variable cammed bearings 35 in the vicinity of their shafts 22. The cams can be adjusted to position the surface 24 of inlay 23 at a level above the surface 5 of board 4.

What is claimed is:

1. Method of adjusting a blade in its lowermost position while replacing a used one in a machine for cutting paper, cardboard, and similar stock, whereby the blade is loosely attached to a blade holder that travels up and down, whereby the blade can be loosened from the holder and raised and lowered therein, whereby with the blade holder down, the blade can be adjusted by lowering it against at least one support at the level of the stock being cut, and whereby the machine is provided with a stock-positioning board and a backing strip, characterized in that a. the backing strip is removed from the stock-positioning board,
   b. the support is advanced out of a disengaged position and into an engaged, blade-adjustment, position,
   c. the blade holder, accommodating the blade loose in its raised position, is lowered into its lowermost position,
   d. the blade is lowered onto the support in its engaged position and secured tight to the blade holder in that position,
   e. the blade holder is raised,
   f. the support is returned into its disengaged position, and
   g. the backing strip is replaced in the stock-positioning board.

2. Method as in claim 1, characterized in that all the steps are followed in the sequence a through g.

3. Method as in claim 1, characterized in that steps a through c are carried out in any order and followed by step d.

4. Method as in as in claim 1 or 3, characterized in that steps f and g are carried out in either order after [sic!—trans.] step e.

5. Method as in one of claims 1 through 4, characterized in that the support is raised when the backing strip is removed from the stock-positioning board and lowered when the strip is replaced.

6. Method as in one of claims 1 through 5, characterized in that the support is advanced out of a lower and disengaged position into an upper and engaged position to adjust the blade.

\* \* \* \* \*